Dec. 25, 1951  A. T. SCHEIWER  2,579,972
TESTING DEVICE FOR COMPARATIVELY SHORT TUBES
Filed May 24, 1947

INVENTOR.
Albert T. Scheiwer
BY
Florian G. Miller
Atty.

Patented Dec. 25, 1951

2,579,972

UNITED STATES PATENT OFFICE 2,579,972

TESTING DEVICE FOR COMPARATIVELY SHORT TUBES

Albert T. Scheiwer, Erie, Pa.

Application May 24, 1947, Serial No. 750,349

3 Claims. (Cl. 73—37)

This invention relates generally to testing devices for comparatively short tubular members and it relates more particularly to novel coupling means combined with a novel assembling device for testing comparatively short tubular members.

The device heretofore used for testing comparatively short tubular members comprised the assembly on the ends of the tubular members, of a series of threadable connections which invariably leaked and which required another threaded member for connection to a source of fluid for the tube to be tested. These prior assemblies for testing short tubes required a considerable amount of time to assemble on the tubes and the cost of testing approached the cost of the tubing itself.

It is an object of my invention to provide a novel assembly for sealingly engaging both ends of a tubular member to be tested in a minimum of time without requiring any threadable connections and with a further provision of a male member of a snap-type coupling which is simple in construction, economical in cost, economical in manufacture, and efficient in use.

Other objects of my invention will become evident from the following detailed description, taken in conjunction with the accompanying drawings, in which.

Figures 1, 2, 3:
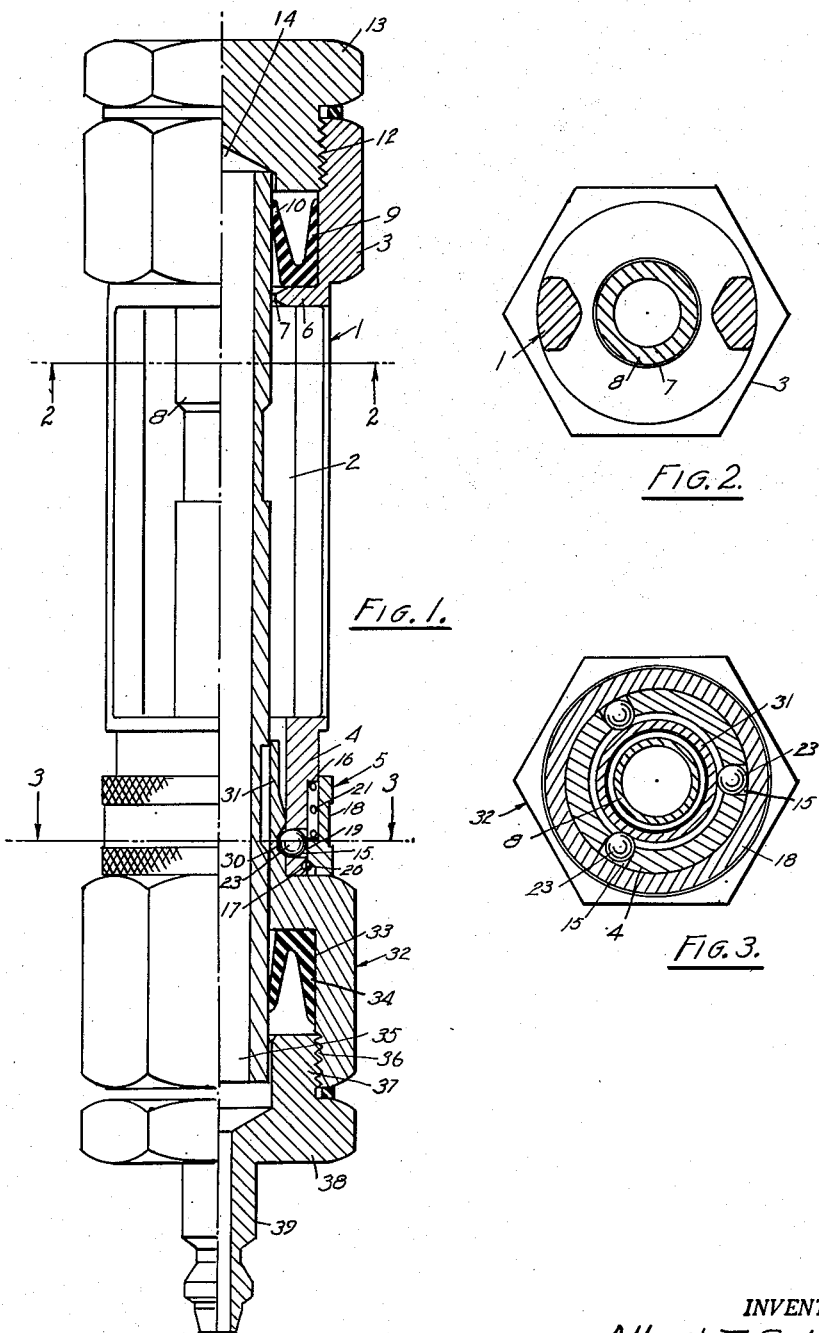
Fig. 1 is a side elevational view of my novel device for testing comparatively short tubular members with parts thereof broken away for better illustration.
Fig. 2 is a view taken on the line 2—2 of Fig. 1.
Fig. 3 is a view taken on the line 3—3 of Fig. 1.

Referring now to the drawings, Figs. 1, 2 and 3 show a cylindrical body member 1 having an an intermediate open portion 2, an enlarged portion 3 at one end thereof, and an inner sleeve 4 of a female coupling member 5 formed on the opposite end thereof. An inwardly extending flanged portion 6 forms an aperture 7 for receiving one end of a tubular member 8 to be tested. A V-shaped washer 9 is disposed adjacent to the flanged portion 6 and engages the outer periphery of the tube 8 to be tested. It will be noted that leg 10 of the V-shaped washer 9 adapted to engage the periphery of the tubular member 8 is tapered to substantially a point and is comparatively thin so that the sealing engagement between the leg 10 of the washer 9 and the tube 8 is assured. The enlarged end 3 of the member 1 has an internally threaded portion 12 for vertically engaging a cap member 13 for closing one end of the tubular member 1. The cap member 13 has a recess 14 for receiving the end of the tube 8 to be tested.

The inner sleeve 4 of the female member 5 formed on the cylindrical member 1, has ball retaining apertures 15, a stepped shoulder 16, and a peripheral groove 17. A locking sleeve 18 having a camming portion 19 is telescopically disposed on the inner sleeve 4 and is urged against a stop clip 20 disposed in the groove 17 by a spring 21 abutting the stepped shoulder 16 of the inner sleeve 4. Ball or camming members 23 are carried and retained by the retaining apertures 15 in the sleeve 4 and are adapted to lockingly engage the peripheral groove 30 of the connecting portion 31 of a male member 32. The male member 32 has a counterbore 33 for receiving a V-shaped washer 34 which sealingly engages the tube 8 to be tested. The washer 34 is of the same construction as the washer 9 heretofore described. The aperture 35 in the connection portion 31 of the male member 32 is of substantially the same size as the tubular member 8. The male member 32 has a threaded portion 36 threadably engaging the threaded flange portion 37 of a male member 38 having a connecting portion 39 for connection to the female member of a snap-type coupling.

In operation, the male member 32 is moved from the female member 5 by moving the locking sleeve 18 against the force of the spring 21 to free the locking ball members 15 from the peripheral groove 30 in the connecting portion 31 of the male member 32. A tubular member 8 to be tested is then disposed in the member 1 as shown in Fig. 1 and the connecting portion 31 of the male member 32 is disposed over the end of the tubular member 8 and locked in the position shown in Fig. 1 by the ball members 15 and locking sleeve 18. A female member of conventional type on a hose or other connection is then connected to the connecting portion 39 of the male member 38 and pressure is applied to the internal portion of tubular member 8 for testing purposes. The member 1 may be made any length desired to test straight tubular members and it will be evident that a tubular member of three, four or five feet or longer may be tested with my novel device. A battery of tubular members can be set up in seriatim by one person and a second person can follow with a source of fluid and connect the female member on the fluid hose to the male member 38 and test the tubular members in a minimum of time. The sensitive washers 9 and 34 sealingly engage the periphery of the tubular members so that no leakage results in the use of my novel testing device.

From the foregoing description it will be evident that I have provided a novel testing device for tubular members wherein the tube may be disposed in the device in a minimum of time and connections may be made thereto in a minimum of time and with a minimum of effort. Furthermore I have eliminated all threadable connections and the cost of my novel device is very small with the result that the testing operation in the factory is very economical and is only a small part of the total cost or production.

Various changes may be made in the specific embodiment of my invention without departing from the spirit thereof or from the scope of the appended claims.

What I claim is:

1. A testing device of the type described comprising a member having a closed end, means in said closed end for sealingly engaging the open end of a tubular member to be tested, a female coupling member on the opposite end of said member having an axially extending aperture, a male coupling member having a connecting portion adapted to receive a tubular member to be tested axially thereof extending into the aperture in said female coupling member, releasable camming means for locking said male and female members together, and sealing means in said male member for sealingly engaging said tube, a hose connecting member attached to said male member, and a source of fluid for exerting pressure on the interior of said tubular member.

2. A testing device as set forth in claim 1 wherein said member having a closed end has a portion thereof between said closed end and the female coupling member on the opposite end thereof open to expose to atmosphere the intermediate portion of the tube being tested.

3. A testing device for testing tubular members comprising a body member having an intermediate open portion, a closed recessed portion on one end thereof for receiving one end of a tubular member to be tested, an inner sleeve for a female coupling member having ball retaining apertures on the opposite end of said body member, a locking sleeve telescopically disposed on said inner sleeve, ball members in the ball retaining apertures in said inner sleeve, a male member having a connecting portion adapted to receive a tubular member and having a peripheral groove for locking engagement with the ball members in said inner sleeve of said female member, and means for sealingly engaging the ends of said tubular member to be tested, hose connecting means attached to said male member, and a source of fluid for exerting pressure on the interior of said tubular member.

ALBERT T. SCHEIWER.

REFERENCES CITED

The following references are of record in the file of this patent:

UNITED STATES PATENTS

| Number | Name | Date |
| --- | --- | --- |
| 1,222,817 | Sobraske | Apr. 17, 1917 |
| 2,297,548 | Fox et al. | Sept. 29, 1942 |
| 2,377,812 | Scheiwer | June 5, 1945 |
| 2,420,372 | Heidbrink | May 13, 1947 |
| 2,429,202 | Estill et al. | Oct. 21, 1947 |

FOREIGN PATENTS

| Number | Country | Date |
| --- | --- | --- |
| 551,566 | Great Britain | Mar. 1, 1943 |